US010204049B2

(12) United States Patent
Geetha et al.

(10) Patent No.: US 10,204,049 B2
(45) Date of Patent: Feb. 12, 2019

(54) VALUE OF FORWARD STATE BY INCREASING LOCAL CACHING AGENT FORWARDING

(75) Inventors: Vedaraman Geetha, Fremont, CA (US); Jeffrey D. Chamberlain, Tracy, CA (US); Sailesh Kottapalli, San Jose, CA (US); Ganesh Kumar, Fort Collins, CO (US); Henk G. Neefs, Palo Alto, CA (US); Neil J. Achtman, Santa Clara, CA (US); Bongjin Jung, Westford, MA (US)

(73) Assignee: Intel Corporation, Santa Clara, CA (US)

( * ) Notice: Subject to any disclaimer, the term of this patent is extended or adjusted under 35 U.S.C. 154(b) by 1217 days.

(21) Appl. No.: 13/808,595

(22) PCT Filed: Jan. 6, 2012

(86) PCT No.: PCT/US2012/020408
§ 371 (c)(1),
(2), (4) Date: Oct. 28, 2014

(87) PCT Pub. No.: WO2013/103347
PCT Pub. Date: Jul. 11, 2013

(65) Prior Publication Data
US 2018/0081808 A1 Mar. 22, 2018

(51) Int. Cl.
G06F 12/084 (2016.01)
G06F 12/0817 (2016.01)

(52) U.S. Cl.
CPC ........ *G06F 12/0817* (2013.01); *G06F 12/084* (2013.01); *G06F 2212/622* (2013.01)

(58) Field of Classification Search
CPC ............... G06F 12/0817; G06F 12/084; G06F 2212/622
See application file for complete search history.

(56) References Cited

U.S. PATENT DOCUMENTS

| 5,410,732 A | 4/1995 | Ames et al. |
| 6,009,488 A | 12/1999 | Kaviprapu |
| 2003/0046495 A1 | 3/2003 | Venkitakrishnan et al. |
| 2004/0122966 A1 | 6/2004 | Hum et al. |

(Continued)

FOREIGN PATENT DOCUMENTS

| EP | 0528639 A2 | 2/1993 |
| WO | 2013/103347 A1 | 7/2013 |

OTHER PUBLICATIONS

International Search Report and Written Opinion Received for the PCT Application No. PCT/US2012/020408, dated Sep. 25, 2012, 8 pages.

(Continued)

*Primary Examiner* — Nanci N Wong
(74) *Attorney, Agent, or Firm* — Spectrum IP Law Group LLC

(57) ABSTRACT

Methods and apparatus relating to improving the value of F-state by increasing a local caching agent's data forwarding are described. In one embodiment, the opportunity for forwarding from a local caching agent is improved by allowing the local caching agent to keep an F-state copy of the line while sending an S-state copy to the requestor (e.g., in response to a non-ownership read operation). Other embodiments are also disclosed.

20 Claims, 6 Drawing Sheets

(56) References Cited

U.S. PATENT DOCUMENTS

| | | | |
|---|---|---|---|
| 2004/0123046 A1* | 6/2004 | Hum | G06F 12/0822 711/141 |
| 2005/0160237 A1* | 7/2005 | Tierney | G06F 12/0831 711/145 |
| 2005/0198187 A1* | 9/2005 | Tierney | G06F 12/0828 709/214 |
| 2009/0198694 A1* | 8/2009 | Thomas | G06F 9/466 |
| 2010/0005246 A1* | 1/2010 | Beers | G06F 12/0831 711/146 |
| 2013/0097385 A1* | 4/2013 | Beckmann | G06F 12/0817 711/128 |

OTHER PUBLICATIONS

International Preliminary Report on Patentability and Written Opinion received for PCT Patent Application No. PCT/US2012/020408, dated Jul. 17, 2014, 7 pages.

* cited by examiner

VALUE OF FORWARD STATE BY INCREASING LOCAL CACHING AGENT FORWARDING

FIELD

The present disclosure generally relates to the field of electronics. More particularly, an embodiment of the invention relates to improving the value of Forward state (F-state) by increasing a local caching agent's data forwarding.

BACKGROUND

Cache memory in computer systems may be kept coherent using a snoopy bus or a directory based protocol. In either case, a memory address is associated with a particular location in the system. This location is generally referred to as the "home node" of a memory address.

In a directory based protocol, processing/caching agents may send requests to a home node for access to a memory address with which a corresponding Home Agent (HA) is associated. Accordingly, performance of such computer systems may be directly dependent on how efficiently home agent data and/or memory is managed.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
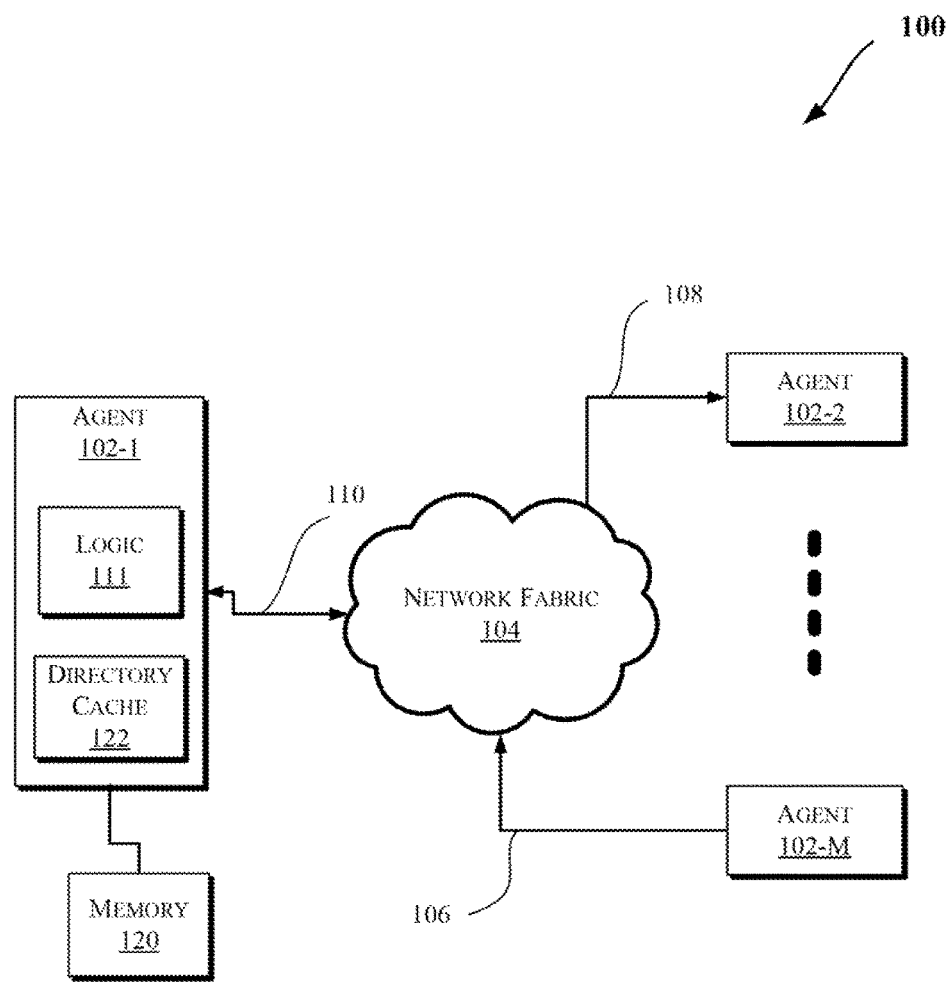
FIGS. 1-2 and 5-6 illustrate block diagrams of embodiments of computing systems, which may be utilized to implement various embodiments discussed herein.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some embodiments improving the value of F-state (Forward state) by increasing a local caching agent's data forwarding. Generally, the F-state refers to a specialized form of the S-state (Shared state) and indicates that a caching agent should act as a designated responder/forwarder for any non-ownership requests for the given line. Currently, the protocol may ensure that, if any cache holds a line in the S-state, exactly one other cache holds the same line in the F-state. An embodiment increases data forwarding from a local caching agent for non-ownership reads by proactively keeping a cache line in the F-state in the local caching agent. Forwarding from the local caching agent would in turn result in lower latency for any read transaction targeting the home agent for the corresponding data.

Generally, cache memory in computing systems may be kept coherent using a snoopy bus or a directory based protocol. In either case, a system memory address may be associated with a particular location in the system. This location is generally referred to as the "home node" of the memory address. In a directory based protocol, processing/caching agents may send requests to the home node for access to a memory address with which a "home agent" (or HA) is associated. Moreover, in distributed cache coherence protocols, caching agents (CAs) may send requests to home agents which control coherent access to corresponding memory spaces (e.g., a subset of the memory space is served by the collocated memory controller). Home agents are, in turn, responsible for ensuring that the most recent copy of the requested data is returned to the requestor either from memory or a caching agent which owns the requested data. The home agent may also be responsible for invalidating copies of data at other caching agents if the request is for an exclusive copy, for example. For these purposes, a home agent generally may snoop every caching agent or rely on a directory (e.g., directory cache 122 of FIG. 1 or a copy of a memory directory stored in a memory, such as memory 120 of FIG. 1) to track one or more caching agents where the data may reside. In an embodiment, the directory cache 122 may include a full or partial copy of the directory stored in the memory 120.

Moreover, forwarding may improve performance more when a (non-ownership) request is from a remote socket and the local caching agent in the home socket/node has the cache line in the F-state. This is because, in most directory based home snoop protocol implementations, the local snoop is issued before the directory is looked up. Since the local snoop is to the cache agent on the same socket as the home agent, it has very low latency compared to remote snoops and may hence deliver the data to the requestor much faster than through a memory read, for example. When a line is forwarded from the F-state, the caching agent that does the forwarding normally retains an S-state copy of the line while sending an F-state copy to the requestor.

Some embodiments improve the opportunity for forwarding from the local caching agent by: (1) allowing the local caching agent to keep an F-state copy of the line while sending an S-state copy to the requestor (e.g., in response to a non-ownership read operation); (2) conditionally downgrading the line from F-state to S-state, without forwarding on non-ownership snoops from remote home agents, resulting in non-forward responses to the remote home agent; and/or (3) allowing the home agent to return the line in F-state to the local caching agent on a non-ownership read operation that sees the directory or system state (based on responses) in the shared (S) state.

Various computing systems may be used to implement embodiments, discussed herein, such as the systems discussed with reference to FIGS. 1-2 and 5-6. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 5-6.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network (which may be configured as a ring in an embodiment). For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may include or have access to one or more logics (or engines) 111 to provide for improving the value of F-state by increasing a local caching agent's data forwarding, as discussed herein, e.g., with reference to FIGS. 1-6. Further, in an embodiment, one or more of the agents 102 (only one shown for agent 102-1) may have access to a memory (which may be dedicated to the agent or shared with other agents) such as memory 120. Also, one or more of the agents 102 (only one shown for agent 102-1) may maintain entries in one or more storage devices (only one shown for agent 102-1, such as directory cache(s) 122, e.g., implemented as a table, queue, buffer, linked list, etc.) to track information about items stored/maintained by the agent 102-1 (as a home agent) and/or other agents (including CAs for example) in the system. In some embodiments, each or at least one of the agents 102 may be coupled to the memory 120 and/or a corresponding directory cache 122 that are either on the same die as the agent or otherwise accessible by the agent.

Figure 2:
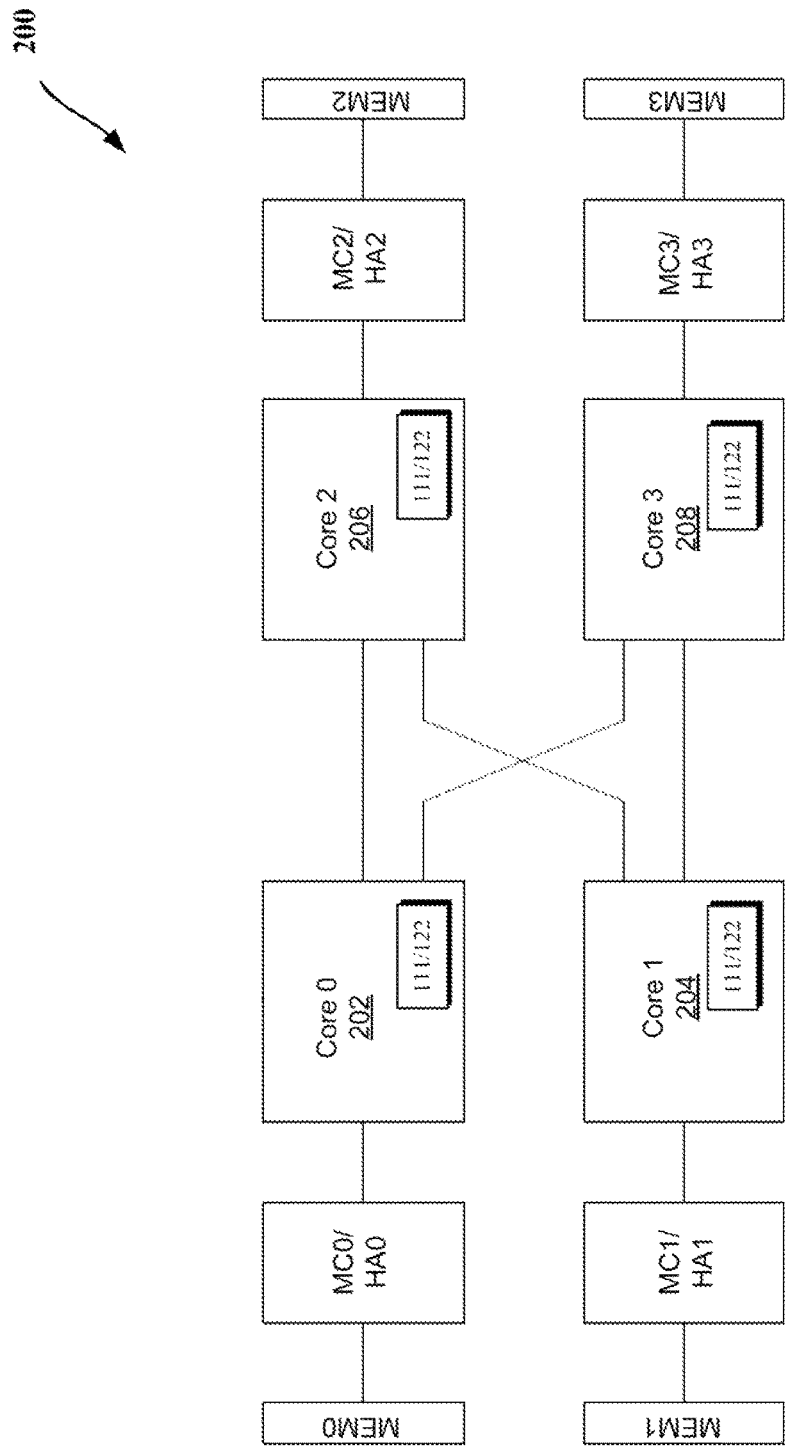

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 6. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 612 of FIG. 6). In some embodiments, the memory controller (MC)/Home Agent (HA) (such as MC0/HA0 through MC3/HA3) may be the same or similar to agent 102-1 of FIG. 1 (e.g., including logic 111, etc.) and the memory, labeled as MEM0 through MEM3, may be the same or similar to memory 120 of FIG. 1. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links. Also, the directory associated with memory controller MC3/HA3 may be initialized in the unknown (U)-state upon a copy to mirror. Upon failover to this controller (e.g., due to an online service-call for this memory controller), the directory may be reconstructed from the U-state.

As discussed above, in a directory controlled home snoop protocol system, the directory information is generally read from the memory first to determine if snooping of caching agents is needed from the home agent. Specifically, in directory based systems which implement the shared (S) state in the directory, the shared (S) state saves snoop broadcast overhead for non-ownership read transactions by directly returning data from the memory in the S-state without having to broadcast any snoops. Once the directory enters into the shared (S) state, the value of a cache line in the F-state diminishes since the directory will indicate that the memory may return data in the S-state to the requestor without broadcasting any snoops. The one exception is if the non-ownership request is remote, and the cache line is in the F-state in the local caching agent of the home socket. In this case, the local snoops are issued in parallel with directory lookup. Local snoop will finish and forward the data (if possible) to the requestor much faster than memory. Normally, the forwarding caching agent will keep an S-state copy of the line and forward an F-state copy to the requestor. With this sequence completed, the local caching agent will have given up the F-state of the line and will rarely be able to receive the line in F-state again. Even if the local caching agent drops the S-copy of the line and requests for the line again, it will only get an S-copy of the line since the directory is in the shared (S) state. When the directory is in the shared (S) state, it is safe to return S-state to the requestor for a non-ownership read since there might already be another F-copy in the system. Thus, the value of F-state is very diminished for directory based systems with support for shared (S) state in the directory since data is often returned from memory.

To this end, some embodiments allow the local caching agent to keep the F-state copy of the line and forward an S-state copy to the requestor. It may also allow an F-state copy to always be returned to a local caching agent even if another caching agent in the system may have an F-state copy, by providing a mechanism to conditionally downgrading from F-state to S-state without forwarding on remote non-ownership snoops.

Operations discussed with reference to FIGS. 3-4 may be performed by components discussed with reference to FIG. 1, 2, 5, or 6. As discussed herein (e.g., with reference to FIGS. 3-4), "CPU" refers to Central Processing Unit, "HA" refers to Home Agent, "F" refers to a forward cache state, "I" refers to an invalid cache state, "S" refers to a shared cache state, "MemRd" refers to a memory read operation, "SnpData" refers to snoop data, "RspFwdS" refers to response forwarded after entering S-state, "DataC_S" refers to data returned in S state, "Dir" refers to memory directory (such as discussed with reference to FIG. 1), "Cmp" refers to a completion signal, and "DataC_S_Cmp" refers to a completion signal with DataC_S.

Figure 3:
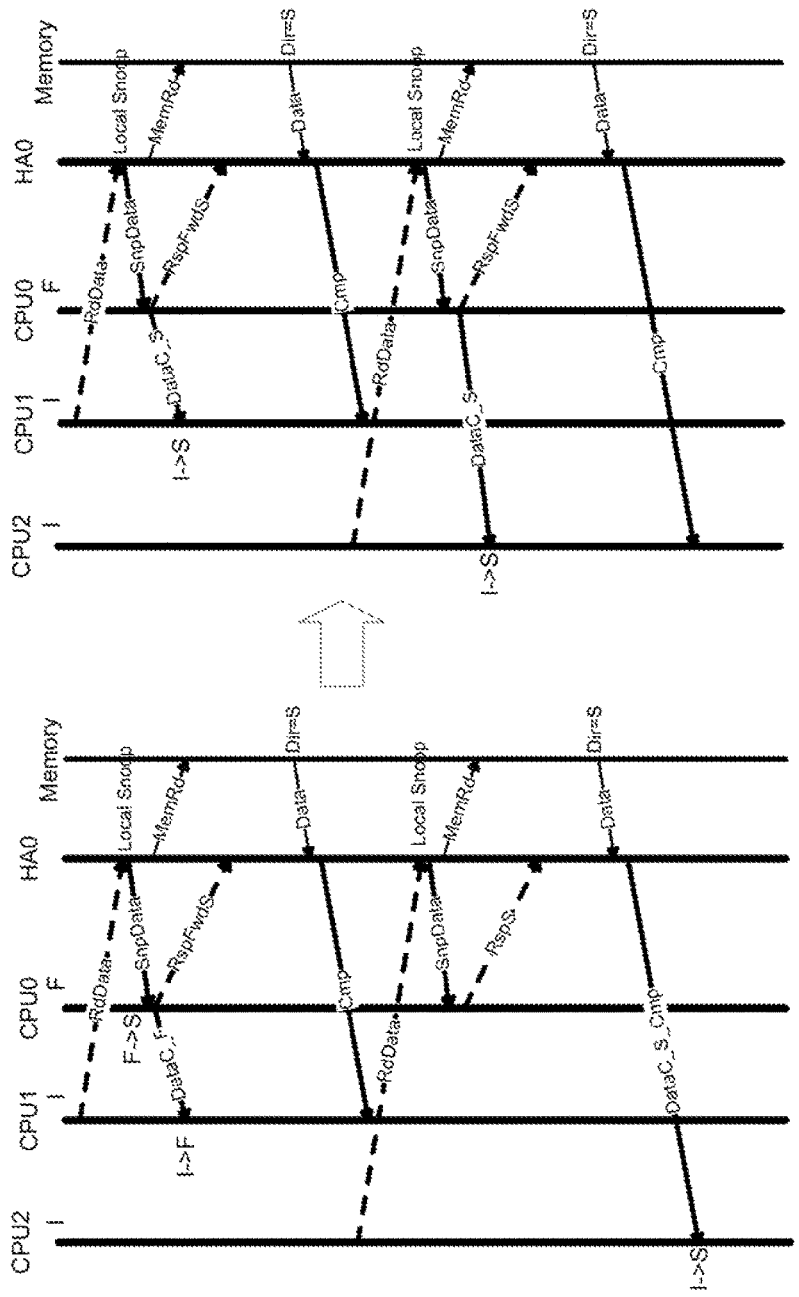
FIGS. 3-4 illustrate flow diagrams according to some embodiments.
Figure 4:
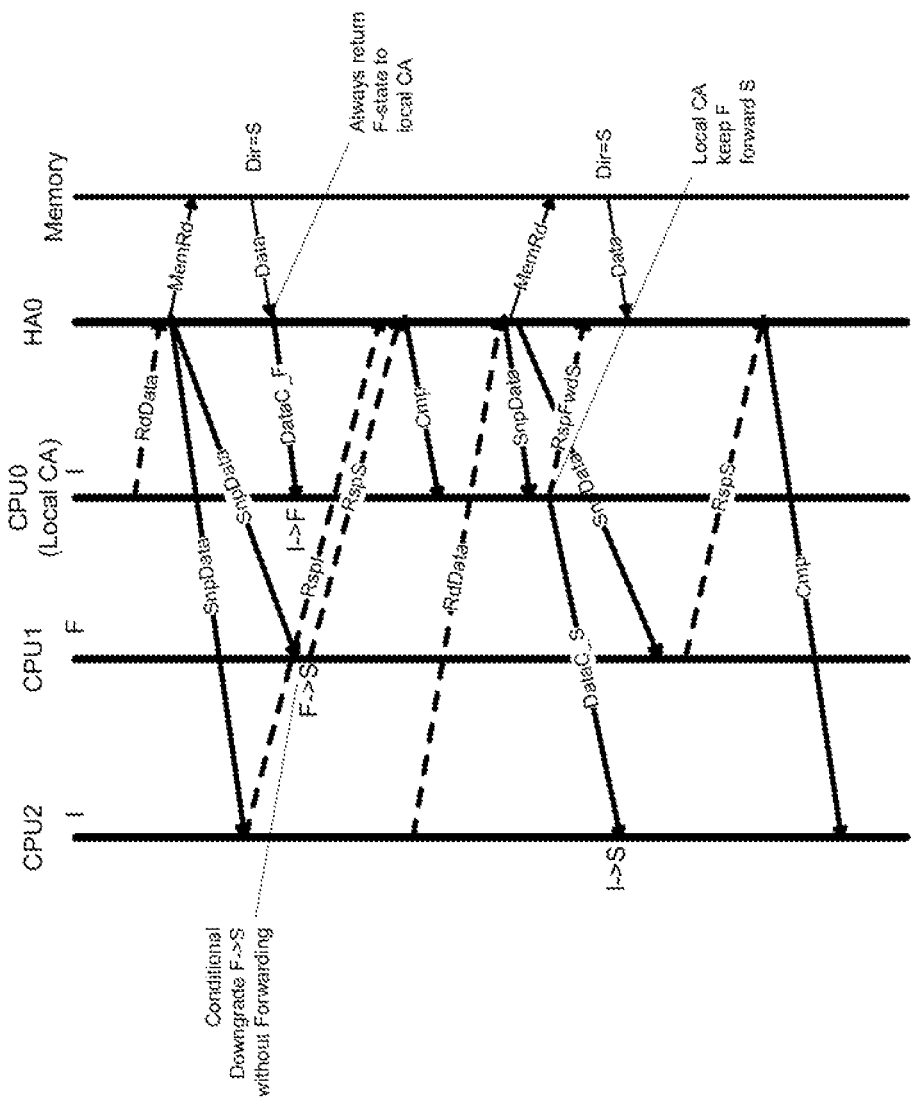

More specifically, FIG. 3 illustrates an original flow versus F-state optimized flow, according to an embodiment. CPU0 is the local caching agent in FIG. 3. As illustrated in FIG. 3, the flow on the right side clearly returns the requested data much sooner than the flow on the left side. FIG. 4: illustrates a flow diagram of a conditional downgrade from F-state to S-state, according to an embodiment. As shown, F-state is returned to the local caching agent (in this example, snoops are broadcast in parallel with memory lookup according to an embodiment).

Accordingly, some embodiments improve processor performance by reducing load-to-use latency of shared non-ownership read transactions by in part increasing the occurrence of local caching agent forwarding, which has the lowest latency for transactions that target the home agent. Performance may be further increased by NUMA (Non-Uniform Memory Access) aware shared memory applications which place each process on the socket where most of its data is stored.

Moreover, one purpose for having a cache line in the F-state is to allow forwarding of the line from one caching agent to another in response to a non-ownership snoop. If the directory supports shared (S) state, it is possible to return data from memory for non-ownership reads even when there are remote sharers. Forwarding from the F-state may be beneficial only if the forwarding latency is lower than the memory lookup/return latency. Forwarding may be most beneficial when a request (non-ownership) is from a remote socket and the local caching agent in the home socket has the cache line in the F-state. This is because in most implementations of directory based home snoop protocol, local snoops are always issued before directory is looked up or at least long before the directory state and data return from memory. Since the local snoop is to the caching agent on the same socket as the home agent, it has very low latency compared to remote snoops and may hence deliver the data to the requestor much faster than a memory read. Even in the presence of a directory cache, there is performance value in some embodiments because the data may still delivered with lower latency from the local cache. Without such embodiments, when a line is forwarded from the F-state, the caching agent that does the forwarding normally retains an S-copy of the line while sending an F-copy to the requestor.

Additionally, the conditional downgrade from F-state to S-state on remote non-ownership snoops can guarantee the home agent that it may send a line in F-state to the local caching agent even if another caching agent in the system has an F-copy. This is because, when there is a snoop broadcast, only one of the F-copies will not downgrade from F-state to S-state. This will be the F-copy in the local caching agent and the local caching agent will end up forwarding the line to the requestor. And, forwarding from the local caching agent will result in the lowest latency for any transaction. Alternatively, downgrading the line from F-state to S-state, while installing the line in the cache if the cache line is remotely homed, ensures that there may only be one F-copy in the system and that F-copy will be in the local caching agent. Keeping the F-copy in the local caching agent and always returning data to the local caching agent in the F-state will increase the presence of F-state in the local caching agent. Increasing the occurrences of forwards from the local caching agent improves the value of F-state since these results in the lowest latency for the read transaction.

Figure 5:
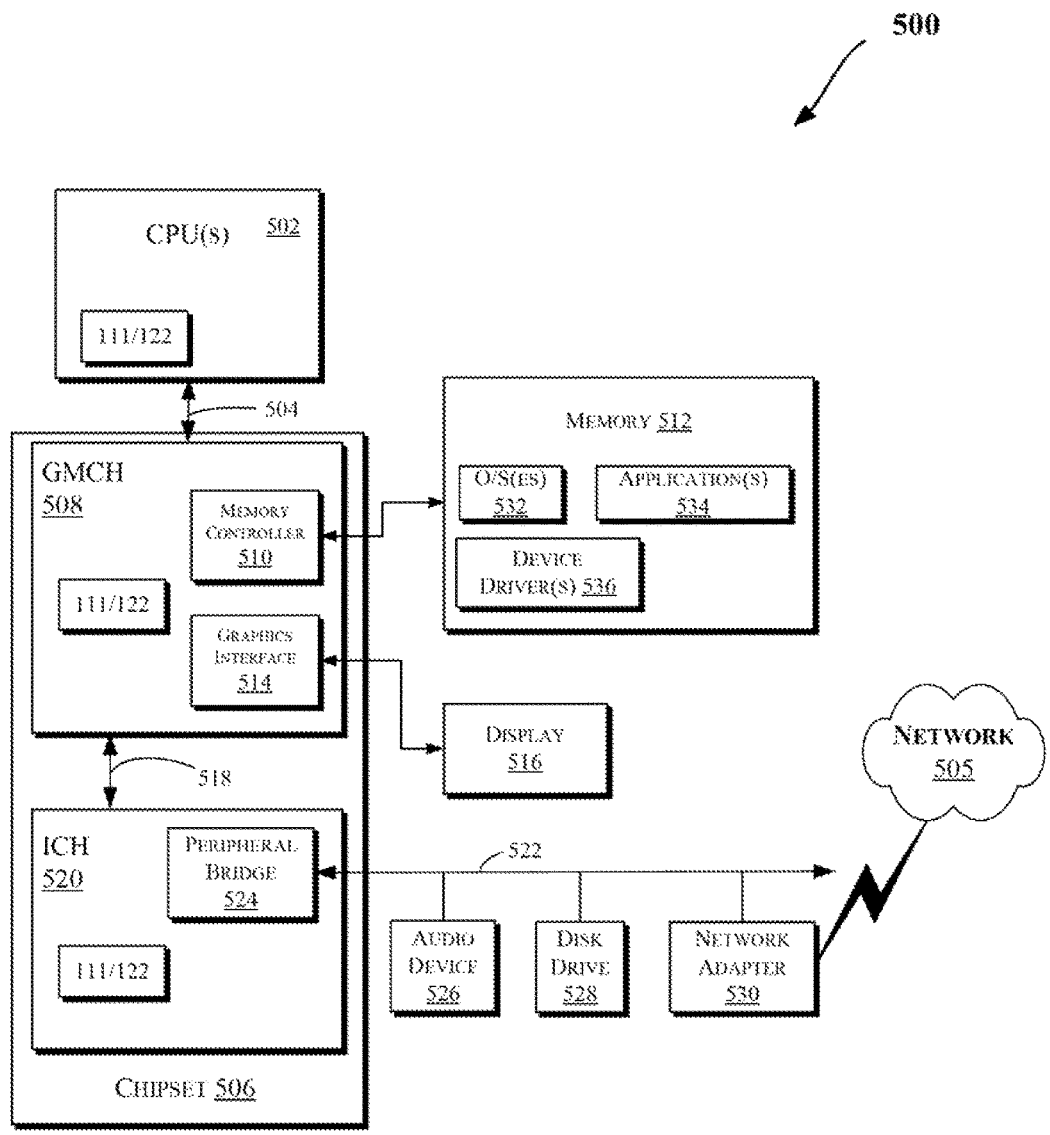

FIG. 5 illustrates a block diagram of an embodiment of a computing system 500. One or more of the agents 102 of FIG. 1 may comprise one or more components of the computing system 500. Also, various components of the system 500 may include a directory cache (e.g., such as directory cache 122 of FIG. 1) and/or a logic (such as logic 111 of FIG. 1) as illustrated in FIG. 5. However, the directory cache and/or logic may be provided in locations throughout the system 500, including or excluding those illustrated. The computing system 500 may include one or more central processing unit(s) (CPUs) 502 (which may be collectively referred to herein as "processors 502" or more generically "processor 502") coupled to an interconnection network (or bus) 504. The processors 502 may be any type of processor such as a general purpose processor, a network processor (which may process data communicated over a computer network 505), etc. (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include one or more caches (e.g., other than the illustrated directory cache 122), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) may be located in various locations (e.g., inside other components to the computing systems discussed herein, including systems of FIG. 1, 2, 5, or 6).

A chipset 506 may additionally be coupled to the interconnection network 504. Further, the chipset 506 may include a graphics memory control hub (GMCH) 508. The GMCH 508 may include a memory controller 510 that is coupled to a memory 512. The memory 512 may store data, e.g., including sequences of instructions that are executed by the processor 502, or any other device in communication with components of the computing system 500. Also, in one embodiment of the invention, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The GMCH 508 may further include a graphics interface 514 coupled to a display device 516 (e.g., via a graphics accelerator in an embodiment). In one embodiment, the graphics interface 514 may be coupled to the display device 516 via an accelerated graphics port (AGP). In an embodiment of the invention, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the GMCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a peripheral component interconnect (PCI) bridge that may be compliant with the PCIe specification, a universal serial bus (USB) controller, etc. The bridge 524 may provide a data path between the processor 502 and peripheral devices. Other types of topologies may be utilized. Also, multiple buses may be coupled to the ICH 520, e.g., through multiple bridges or controllers. Further, the bus 522 may comprise other types and configurations of bus systems. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506. Also, various components (such as the network adapter 530) may be coupled to the GMCH 508 in some embodiments of the invention. In addition, the processor 502 and the GMCH 508 may be combined to form a single chip. In an embodiment, the memory controller 510 may be provided in one or more of the CPUs 502. Further, in an embodiment, GMCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include one or more of the following in an embodiment: an operating system (O/S) 532, application 534, directory 501, and/or device driver 536. The memory 512 may also include regions dedicated to Memory Mapped I/O (MMIO) operations. Programs and/or data stored in the memory 512 may be swapped into the disk drive 528 as part of memory management operations. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter 530 specific commands to provide a communication interface between the O/S 532 and the network adapter 530, or other I/O devices coupled to the system 500, e.g., via the chipset 506.

In an embodiment, the O/S 532 may include a network protocol stack. A protocol stack generally refers to a set of procedures or programs that may be executed to process packets sent over a network 505, where the packets may conform to a specified protocol. For example, TCP/IP (Transport Control Protocol/Internet Protocol) packets may be processed using a TCP/IP stack. The device driver 536 may indicate the buffers in the memory 512 that are to be processed, e.g., via the protocol stack.

The network 505 may include any type of computer network. The network adapter 530 may further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 may include a network adapter controller, which may include logic (such as one or more programmable processors) to perform adapter related operations. In an embodiment, the adapter controller may be a MAC (media access control) component. The network adapter 530 may further include a memory, such as any type of volatile/nonvolatile memory (e.g., including one or more cache(s) and/or other memory types discussed with reference to memory 512).

Figure 6:
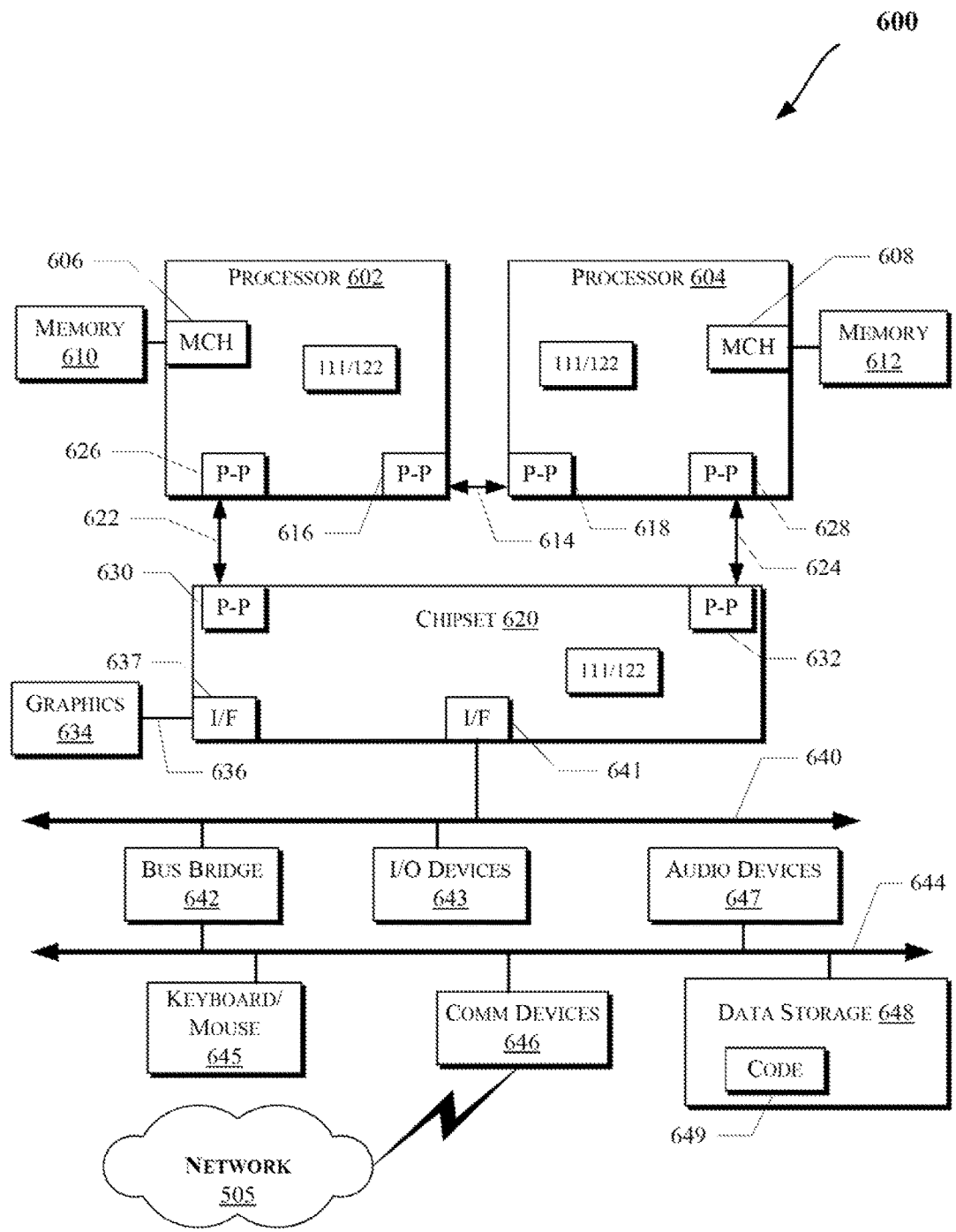

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (GMCH) 606 and 608 to enable communication with memories 610 and 612. The memories 610 and/or 612 may store various data such as those discussed with reference to the memory 612 of FIG. 6. As shown in FIG. 6, the processors 602 and 604 (or other components of system 600 such as chipset 620, I/O devices 643, etc.) may also include one or more cache(s) such as those discussed with reference to FIGS. 1-6.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, a directory cache and/or logic may be provided in one or more of the processors 602, 604 and/or chipset 620. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6. For example, various components of the system 600 may include a directory cache (e.g., such as directory cache 122 of FIG. 1) and/or a logic (such as logic 111 of FIG. 1). However, the directory cache and/or logic may be provided in locations throughout the system 600, including or excluding those illustrated.

The chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 605), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
    receiving a request for data at a first agent from a second agent via a link; and
    causing the first agent to keep a copy of the requested data in a Forward-state (F-state) while transmitting the requested data in a Shared state (S-state) to the second agent via the link, wherein transmission of the requested data to the second agent occurs prior to transmission of: a first signal to indicate that a response is forwarded after entry into S-state and a second signal to indicate completion of the request, wherein the second signal is transmitted after the first signal, wherein data from memory is read after transmission of the first signal and prior to transmission of the second signal.

2. The method of claim 1, further comprising causing the first agent to return the requested data in the F-state even if another agent has the requested data in the F-state.

3. The method of claim 1, further comprising causing a change in a state of the requested data from the F-state to the S-state without forwarding in response to non-ownership snoops from remote agents.

4. The method of claim 1, further comprising causing the first agent to return the requested data in the F-state in response to a non-ownership read transaction with a directory or system state in the S-state.

5. The method of claim 1, further comprising the first agent accessing data in the memory in response to the data request.

6. An apparatus comprising:
    a first agent to receive a request for data from a second agent via a link; and
    logic, at least a portion of which is in hardware, to cause the first agent to keep a copy of the requested data in a Forward-state (F-state) while transmitting the requested data in a Shared state (S-state) to the second agent via the link, wherein transmission of the requested data to the second agent is to occur prior to transmission of: a first signal to indicate that a response is forwarded after entry into S-state and a second signal to indicate completion of the request, wherein the second signal is to be transmitted after the first signal, wherein data from memory is to be read after transmission of the first signal and prior to transmission of the second signal.

7. The apparatus of claim 6, wherein logic is to cause the first agent to return the requested data in the F-state even if another agent has the requested data in the F-state.

8. The apparatus of claim 6, wherein logic is to cause a change in a state of the requested data from the F-state to the S-state without forwarding in response to non-ownership snoops from remote agents.

9. The apparatus of claim 6, wherein logic is to cause the first agent to return the requested data in the F-state in response to a non-ownership read transaction with a directory or system state in the S-state.

10. The apparatus of claim 6, wherein the memory is coupled to the first agent, wherein the first agent is to access data in the memory.

11. The apparatus of claim 6, wherein the first agent and the second agent are to maintain a directory, the directory to store information about at which agent and in what state each cache line is cached.

12. The apparatus of claim 6, wherein the first agent is to comprise the logic.

13. The apparatus of claim 6, wherein the first agent and the second agent are on a same integrated circuit die.

14. The apparatus of claim 6, wherein the link is to comprise a point-to-point interconnect.

15. The apparatus of claim 6, wherein one or more of the first agent or the second agent are to comprise a plurality of processor cores.

16. The apparatus of claim 6, wherein one or more of the first agent or the second agent are to comprise a plurality of sockets.

17. A system comprising:
   memory to store a directory, the directory to store information about at which agent and in what state each cache line is cached; and
   a first agent to receive a request for data from a second agent via a link; and
   logic to cause the first agent to keep a copy of the requested data in a Forward-state (F-state) while transmitting the requested data in a Shared state (S-state) to the second agent via the link, wherein transmission of the requested data to the second agent is to occur prior to transmission of: a first signal to indicate that a response is forwarded after entry into S-state and a second signal to indicate completion of the request, wherein the second signal is to be transmitted after the first signal, wherein data from the memory is to be read after transmission of the first signal and prior to transmission of the second signal.

18. The system of claim 17, wherein logic is to cause the first agent to return the requested data in the F-state even if another agent has the requested data in the F-state.

19. The system of claim 17, wherein logic is to cause a change in a state of the requested data from the F-state to the S-state without forwarding in response to non-ownership snoops from remote agents.

20. The system of claim 17, wherein logic is to cause the first agent to return the requested data in the F-state in response to a non-ownership read transaction with a directory or system state in the S-state.

* * * * *